United States Patent [19]

Hückinghaus et al.

[11] 4,140,043
[45] Feb. 20, 1979

[54] KEY DUPLICATOR

[75] Inventors: Carl F. Hückinghaus; Manfred Erlenbach, both of Gevelsberg, Fed. Rep. of Germany

[73] Assignee: Firma August Börkey Nachf., Gevelsberg, Fed. Rep. of Germany

[21] Appl. No.: 862,357

[22] Filed: Dec. 20, 1977

[30] Foreign Application Priority Data

Jan. 4, 1977 [DE] Fed. Rep. of Germany ....... 2700114

[51] Int. Cl.² .............................................. B23C 1/16
[52] U.S. Cl. .................................................. 90/13.05
[58] Field of Search ........................................ 90/13.05

[56] References Cited
U.S. PATENT DOCUMENTS

| | | | |
|---|---|---|---|
| 1,335,351 | 3/1920 | Segal | 90/13.05 X |
| 2,682,809 | 7/1954 | May | 90/13.05 |

Primary Examiner—Horace M. Culver
Attorney, Agent, or Firm—Karl F. Ross

[57] ABSTRACT

A machine for the duplication of keys comprises a frame on which a carriage, supporting juxtaposed clamps for a sample key and a blank, is swingable about a horizontal guide bar and slidable along the latter. The clamps are held on a common support which is pivotable on the carriage about an axis parallel to the guide bar to facilitate the cutting of convex or laterally slanting lands in a key bit. Two uprights on the frame carry a cutting wheel, rotating on a shaft parallel to the guide bar, and a feeler engageable with the sample key, the feeler having the shape of a vertical blade with a convex key-contacting edge whose radius of curvature equals that of the cutting wheel. The feeler may be spring-urged toward the clamp support and repressible by its contact with the sample key into registry with the cutter periphery.

10 Claims, 3 Drawing Figures

KEY DUPLICATOR

FIELD OF THE INVENTION

Our present invention relates to a key-duplicating machine of the type wherein a sample or specimen key to be copied is clamped alongside a key blank opposite a feeler which follows the contour of the key bit while a rotary cutter or miller correspondingly profiles the blank.

BACKGROUND OF THE INVENTION

The clamps for the sample key and the blank are usually mounted on a carriage which is both swingable and slidable with reference to a frame carrying the cutting wheel and the feeler. For the shaping of key profiles with steep flanks it is convenient to have a single handle controlling both movements of the carriage, e.g. as described in German Pat. No. 1,953,911 in which such a handle is designed as a two-arm lever fulcrumed on the carriage, the short lever arm constituting a sector gear in mesh with rack teeth on a guide bar centered on the swing axis. The relative mobility of the clamp support and the frame in two dimensions, i.e. radially and axially with reference to the cutter axis, allows faithful reproduction of the bit contour in only one plane; if the key bit is of appreciable thickness, its ridges and groove bottoms show a distinct concavity conforming to the curvature of the cutting wheel.

For greater wear resistance, it would be preferable to form these ridges and groove bottoms with convex rather than concave curvatures. Moreover, special keys for safe-deposit boxes or the like are sometimes characteristically profiled in both a longitudinal and a transverse direction, e.g. with lands sloping at various angles relatively to an axial plane.

OBJECT OF THE INVENTION

The object of our present invention, therefore, is to provide a key-duplicating machine of the general character referred to in which the clamps for the specimen or sample key and for the workpiece or key blank have an additional degree of freedom allowing the copying of such transverse profiles.

SUMMARY OF THE INVENTION

This object is realized, pursuant to our present invention, by the provision of a clamp support pivotable on the carriage about a second axis paralleling the swing axis of the carriage (referred to hereinafter as the first axis). Both these axes are parallel to a third axis about which the cutter wheel or miller is rotatable. The feeler confronting the specimen clamp has a convex key-contacting edge which lies in a plane transverse to all these axes and has a radius of curvature equal to that of the cutter wheel with whose periphery that edge registers at least in the operating position, i.e. when engaging a sample key to be duplicated. We prefer, however, to mount the feeler in its holder with limited mobility relative to a holder fixed to the frame, the feeler being biased (e.g. by a spring) toward the confronting specimen clamp so as to slow down the advance of the blank to the cutter.

We have found that, for efficient operation, the distance between the first and second axes should be somewhat less than that between the first and third axes, preferably about five-sixths of the latter distance. The distance of the second axis from the clamp jaws, i.e. from the points of engagement of the specimen and the workpiece, is preferably about three-fifth the distance between the first and second axes.

BRIEF DESCRIPTION OF THE DRAWING

The above and other features of our invention will now be described in detail with reference to the accompanying drawing in which.

SPECIFIC DESCRIPTION

Figure 1:
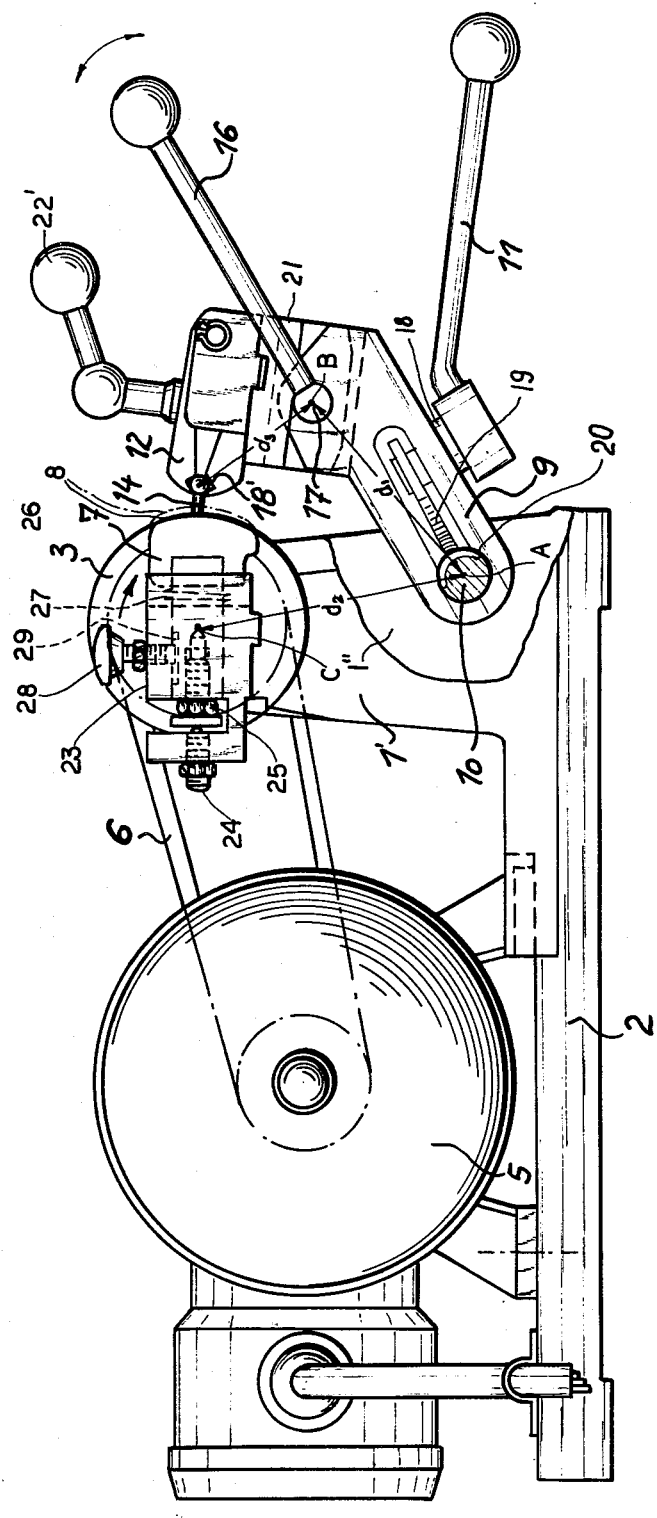
FIG. 1 is a side-elevational view, partly in section, of a key-duplicating machine embodying our invention.

The machine shown in the drawing has a frame including uprights 1', 1" rising from a base 2, upright 1" forming a bearing for a shaft 4 of a cutting wheel or miller 3 driven by a motor 5 via a belt transmission 6. Uprights 1' and 1" are spanned by a horizontal guide bar 10 about which a carriage 9 is swingable while also being longitudinally displaceable therealong. A handle 11, fulcrumed at 18 on the underside of the carriage, forms one arm of a lever whose other arm 19 is a sector gear meshing with rack teeth 20 on bar 10. The rack teeth are curved about the axis A of bar 10 over an arc at least equal to the swing range of carriage 9. Thus, manipulation of handle 11 enables the user to move the carriage horizontally along bar 10 as well as in a vertical plane perpendicular thereto.

A support 21, pivotally mounted on carriage 9, is rigid with an axle 17 paralleling the bar 10. A projecting extremity of this axle carries another handle 16 facilitating a tilting of the support relative to the carriage in either direction from the center position shown in the drawing. Support 21 carries a pair of clamps 12 and 13 with jaws 18' and 18" operable by respective crank arms 22' and 22" to grip a specimen key 14 and a workpiece 15 in the form of a key blank. Axle 17 is centered on an axis B whose distance $d_1$ from swing axis A is roughly five-sixths the distance $d_2$ of the latter axis from the axis C of rotation of cutter wheel 3; jaws 18' and 18" are separated from axis B by a distance $d_3$ equaling approximately three-fifths the distance $d_1$. It will be noted that the radius of wheel 3 nearly equals the distance $d_3$.

Clamp 12 confronts a holder 23, adjustably mounted on upright 1', carrying a feeler 7 in the form of a vertical blade with a convex contact edge 8 whose radius of curvature equals the radius of wheel 3. In the operating position shown in full lines, edge 8 registers with the periphery of wheel 3 so that its spacing from axis C is the same as that of the milling teeth. A screw 24, threaded into holder 23, and another screw 25, threaded into a shank 26 of feeler 7, coact to define the operating position of the latter; the feeler is urged outwardly, i.e. to the right of its operating position as illustrated in phantom lines, by biasing means here shown as a spring 27. A thumbscrew 28 threaded into holder 23 serves for the guidance of feeler shank 26 and plays in a slot 29 thereof to limit its stroke. Upon withdrawal of screw 28, feeler 7 can be extracted from holder 23 for replacement if necessary; its operating position can be adjusted, e.g. for use with a different cutting wheel, by a resetting of screw 24.

In operation, upon the gripping of key 14 and blank 15 by clamp jaws 18' and 18", handle 11 is manipulated to let a bit edge of key 14 come to rest against the extended feeler 7 in a starting position. By the joint actuation of handles 11 and 16, the user can faithfully reproduce the contour of the key bit on the blank 15.

Figure 2:
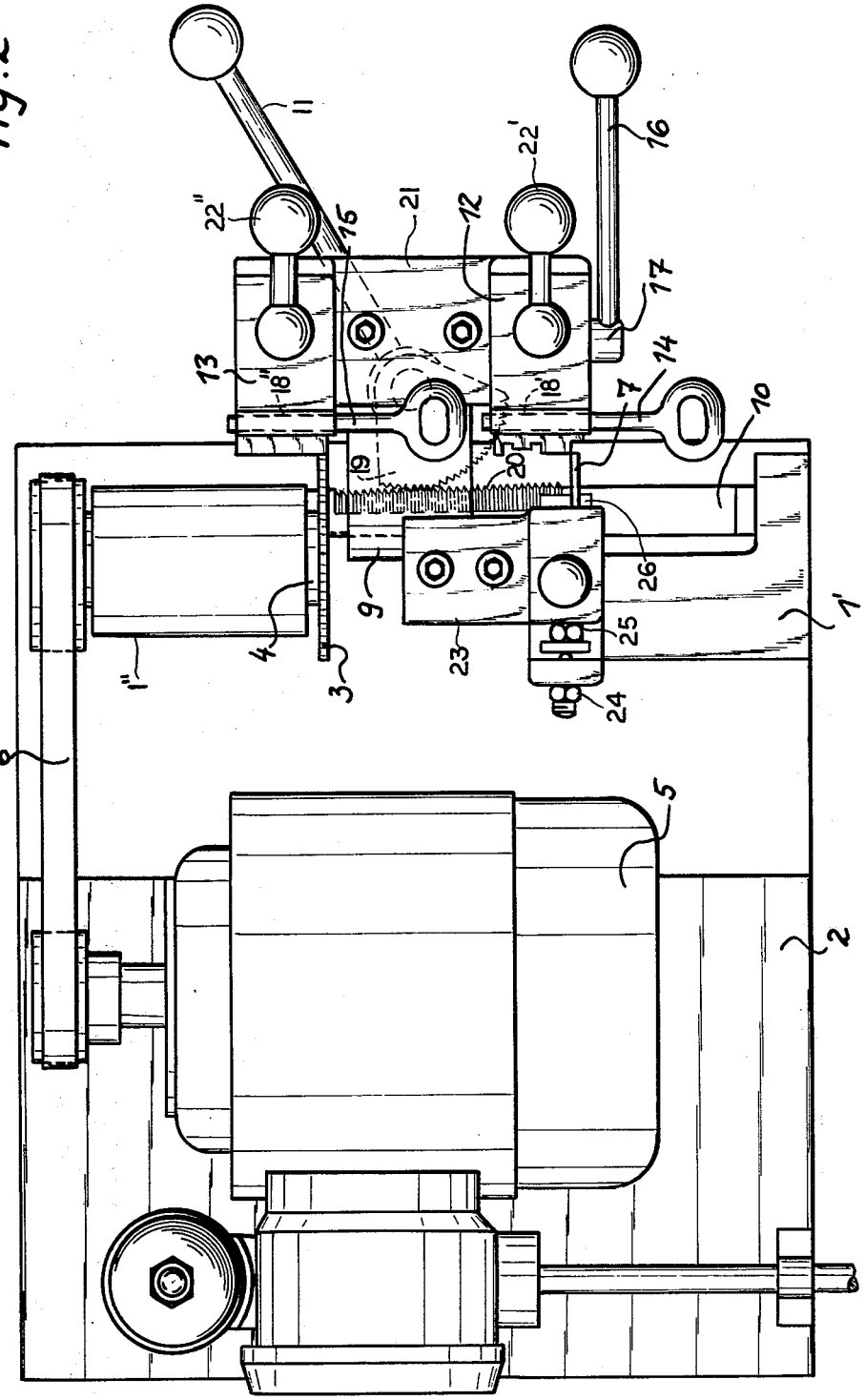
FIG. 2 is a top view of the machine shown in FIG. 1.
Figure 3:
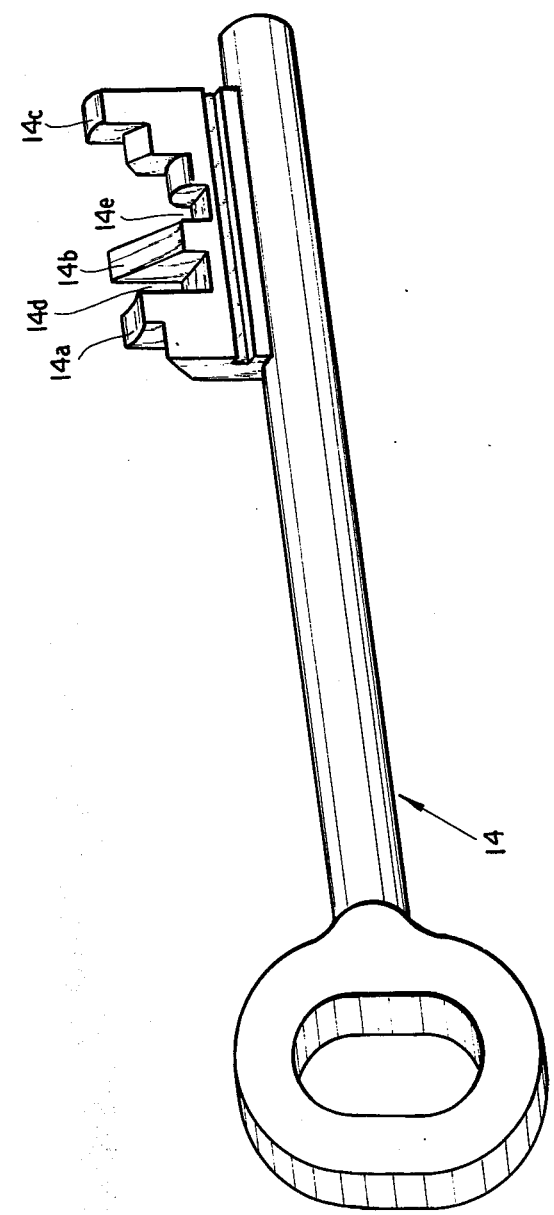
FIG. 3 is a perspective view of a key to be duplicated by the machine of FIGS. 1 and 2.

In FIG. 3 we have shown a representative key 14 whose bit forms teeth 14a, 14b, 14c separated by notches or wards 14d and 14e. Teeth 14a and 14c are shown to be stepped; teeth 14a and 14b form lands sloping in opposite directions whereas tooth 14c has two convex ridges and a gable. All these shapes can be readily milled with our improved key-duplicating machine shown in FIGS. 1 and 2.

The clamps 12 and 13 could also be given a different orientation, e.g. to hold specimen 14 and blank 15 vertical rather than horizontal. They can be designed to hold both single-bit and double-bit keys.

We claim:

1. A machine for duplicating keys, comprising:
   a frame;
   a carriage mounted on said frame with freedom of swinging about a first axis and sliding along said first axis;
   support means on said carriage pivotable thereon about a second axis paralleling said first axis;
   first and second clamping means on said support means respectively engageable with a sample key to be duplicated and with a blank to be conformed to said sample key;
   a holder on said frame confronting said first clamping means;
   a cutter wheel mounted on said frame opposite said second clamping means for rotation about a third axis parallel to said first and second axes;
   drive means for rotating said cutter wheel; and
   a feeler secured to said holder for contact with said sample key, said feeler having a convex key-contacting edge lying in a plane transverse to said axes and having a radius of curvature equal to that of said cutter wheel, said convex edge having an operating position in registry with the periphery of said cutter wheel.

2. A machine as defined in claim 1 wherein said holder is provided with spring means for urging said feeler from said operating position toward said first clamping means.

3. A machine as defined in claim 1 wherein said feeler is a flat blade.

4. A machine as defined in claim 1 wherein the distance of said first axis from said second axis is less than that of said first axis from said third axis.

5. A machine as defined in claim 4 wherein said clamping means have gripper jaws separated from said second axis by a distance substantially less than the spacing of said first and second axes.

6. A machine as defined in claim 5 wherein said cutter wheel has a radius roughly equaling the distance between said gripper jaws and said second axis.

7. A machine as defined in claim 5 wherein the spacing of said first and second axes is approximately five-sixths that of said first and third axes.

8. A machine as defined in claim 7 wherein the distance between said gripper jaws and said second axis is approximately three-fifths the spacing of said first and second axes.

9. A machine as defined in claim 1 wherein said carriage is provided with a first handle for displacing same with reference to said frame and with a second handle for pivoting said support means thereon.

10. A machine as defined in claim 1 wherein said feeler is removably secured to said holder.

* * * * *